US012784587B2

(12) United States Patent
Mindt

(10) Patent No.: US 12,784,587 B2
(45) Date of Patent: Nov. 3, 2026

(54) METHOD FOR CARRYING OUT A PLAUSIBILITY CHECK OF A TRANSMITTED TRAFFIC LIGHT SIGNAL AT AN INTERSECTION SYSTEM

(71) Applicant: Robert Bosch GmbH, Stuttgart (DE)

(72) Inventor: Holger Mindt, Steinheim A. D. Murr (DE)

(73) Assignee: ROBERT BOSCH GMBH, Stuttgart (DE)

( * ) Notice: Subject to any disclaimer, the term of this patent is extended or adjusted under 35 U.S.C. 154(b) by 55 days.

(21) Appl. No.: 18/621,903

(22) Filed: Mar. 29, 2024

(65) Prior Publication Data

US 2024/0346926 A1 Oct. 17, 2024

(30) Foreign Application Priority Data

Apr. 11, 2023 (DE) ..................... 10 2023 203 278.3

(51) Int. Cl.

| | |
|---|---|
| ***G08G 1/0967*** | (2006.01) |
| ***G08G 1/01*** | (2006.01) |
| ***G08G 1/052*** | (2006.01) |
| ***G08G 1/16*** | (2006.01) |
| ***H04W 4/44*** | (2018.01) |

(52) U.S. Cl.

CPC ..... *G08G 1/096725* (2013.01); *G08G 1/0116* (2013.01); *G08G 1/0133* (2013.01); *G08G 1/0141* (2013.01); *G08G 1/052* (2013.01); *G08G 1/096783* (2013.01); *G08G 1/164* (2013.01); *G08G 1/166* (2013.01); *H04W 4/44* (2018.02)

(58) Field of Classification Search

CPC ........... G08G 1/096725; G08G 1/0116; G08G 1/0133; G08G 1/0141; G08G 1/052; G08G 1/096783; G08G 1/164; G08G 1/166; H04W 4/44

USPC .......................................................... 701/118

See application file for complete search history.

(56) References Cited

U.S. PATENT DOCUMENTS

| | | | | |
|---|---|---|---|---|
| 6,100,819 | A * | 8/2000 | White | G08G 1/07 340/908 |
| 9,805,601 | B1 * | 10/2017 | Fields | B60Q 9/008 |
| 9,878,714 | B2 * | 1/2018 | Pascheka | B60W 30/165 |
| 10,235,882 | B1 * | 3/2019 | Aoude | G06N 20/00 |

(Continued)

FOREIGN PATENT DOCUMENTS

| | | |
|---|---|---|
| DE | 102015203115 A1 | 9/2016 |
| DE | 102019119084 A1 | 1/2021 |

(Continued)

*Primary Examiner* — Luis A Martinez Borrero

(74) *Attorney, Agent, or Firm* — NORTON ROSE FULBRIGHT US LLP

(57) ABSTRACT

A method for carrying out a plausibility check of a transmitted traffic light signal at an intersection system. The method includes: receiving a transmitted traffic light signal, wherein the traffic light signal represents a current traffic light phase of a traffic light of the intersection system and an associated lane; acquiring a traffic flow that crosses the traffic flow regulated by the traffic light signal and ascertaining characterizing data of the crossing traffic flow; evaluating the characterizing data to determine whether they correspond to characterizing data to be expected in relation to the transmitted traffic light signal, and issuing a warning if a non-correspondence is detected.

13 Claims, 4 Drawing Sheets

(56) References Cited

U.S. PATENT DOCUMENTS

| | | | | |
|---|---|---|---|---|
| 11,320,816 | B2 * | 5/2022 | Khanna | G01J 3/0275 |
| 11,631,325 | B2 * | 4/2023 | Bai | G05D 1/0088 701/24 |
| 12,249,237 | B2 * | 3/2025 | Scigliano | G08G 1/087 |
| 2009/0048750 | A1 * | 2/2009 | Breed | G08G 1/161 701/70 |
| 2011/0187560 | A1 * | 8/2011 | Stahlin | G08G 1/096758 340/928 |
| 2018/0047286 | A1 * | 2/2018 | Gage | G08G 1/07 |
| 2018/0113200 | A1 * | 4/2018 | Steinberg | B60Q 1/0023 |
| 2018/0190128 | A1 * | 7/2018 | Saigusa | B60W 40/04 |
| 2019/0258251 | A1 * | 8/2019 | Ditty | B60W 50/023 |
| 2019/0311619 | A1 * | 10/2019 | Tao | G08G 1/0112 |
| 2019/0385448 | A1 * | 12/2019 | Montemurro | G08G 1/0112 |
| 2020/0126406 | A1 * | 4/2020 | Ma | G08G 1/0112 |
| 2020/0139969 | A1 * | 5/2020 | Jo | B60W 30/18 |
| 2020/0284883 | A1 * | 9/2020 | Ferreira | G01S 7/497 |
| 2021/0065551 | A1 * | 3/2021 | Manohar | B60Q 9/008 |
| 2021/0142658 | A1 * | 5/2021 | Grimm | G08G 1/0112 |
| 2021/0183244 | A1 * | 6/2021 | Malhan | B64D 1/18 |
| 2022/0139220 | A1 | 5/2022 | Yu | |
| 2022/0332350 | A1 * | 10/2022 | Jha | H04W 4/023 |
| 2022/0383750 | A1 * | 12/2022 | Sharma Banjade | G08G 1/005 |
| 2023/0012196 | A1 * | 1/2023 | Abundis Vargas | G08G 1/096716 |
| 2023/0095384 | A1 * | 3/2023 | Sharma Banjade | G08G 1/096725 701/301 |
| 2023/0113684 | A1 * | 4/2023 | Naga | H04W 24/04 370/241 |
| 2023/0222905 | A1 * | 7/2023 | Xu | G08G 1/0112 340/913 |
| 2023/0230471 | A1 * | 7/2023 | Guney | G08G 1/0133 701/26 |
| 2023/0237904 | A1 * | 7/2023 | Khosla | G08G 1/096725 701/24 |
| 2023/0260398 | A1 * | 8/2023 | Zhou | G08G 1/091 340/425.5 |
| 2024/0038065 | A1 * | 2/2024 | Wong | B60W 30/18154 |
| 2024/0096212 | A1 * | 3/2024 | Khosla | H04W 40/20 |
| 2024/0185714 | A1 * | 6/2024 | Jha | G01C 21/34 |
| 2024/0233521 | A1 * | 7/2024 | Scigliano | G08G 1/093 |
| 2025/0124790 | A1 * | 4/2025 | Dudar | G08G 1/0141 |
| 2025/0131819 | A1 * | 4/2025 | Yuan | B60W 30/143 |
| 2026/0140259 | A1 * | 5/2026 | Steinberg | B60Q 1/0023 |

FOREIGN PATENT DOCUMENTS

| | | | |
|---|---|---|---|
| DE | 102020126628 | A1 | 5/2021 |
| DE | 102021209134 | A1 | 2/2023 |

* cited by examiner

METHOD FOR CARRYING OUT A PLAUSIBILITY CHECK OF A TRANSMITTED TRAFFIC LIGHT SIGNAL AT AN INTERSECTION SYSTEM

CROSS REFERENCE

The present application claims the benefit under 35 U.S.C. § 119 of German Patent Application No. DE 10 2023 203 278.3 filed on Apr. 11, 2023, which is expressly incorporated herein by reference in its entirety.

FIELD

The present invention relates to a method for carrying out a plausibility check of a transmitted traffic light signal at an intersection system, in particular in the context of the operation of an infrastructure system for supporting the driving of at least partially automated connected motor vehicles. The present invention further relates to a device for carrying out a plausibility check of a transmitted traffic light signal at an intersection system. The present invention further relates to an infrastructure system for supporting the driving of at least partially automated connected motor vehicles. The present invention also relates to a computer program.

BACKGROUND INFORMATION

At least partially automated motor vehicles, in particular highly automated vehicles, according to the related art have difficulty safely recognizing traffic lights in urban areas. It can therefore be provided that traffic light systems emit their signals not only by means of light signals, but also by means of radio transmission to vehicles or to another processing unit (ICU, RSU, cloud). A major challenge here is that the requirements placed on the transmitted traffic light signals in terms of safety are very high. For example, if the light signals of the traffic light are showing "red" and the transmitted signal is (erroneously) sending "green", it is very likely at a busy intersection that an accident will occur, because an automated or partially automated vehicle reacts to the transmitted signals, whereas all of the other, manually controlled, vehicles react to the light signals.

A method for ascertaining faulty configurations of signals and detectors of a light signal system is described in German Patent Application No. DE 10 2015 203 115 A1. This involves acquiring measurement data relating to traffic behavior in the vicinity of the light signal system.

U.S. Patent Application Publication No. US 2022/0139220 A1 describes a method for checking the plausibility of traffic light signals, in which a comparison is carried out between a traffic light signal state acquired in different ways and the control information relating to the traffic light state.

SUMMARY

It is an object of the present invention to provide a reliable method for carrying out a plausibility check of a transmitted traffic light signal at an intersection system, in particular in the context of the operation of an infrastructure system for supporting the driving of at least partially automated connected motor vehicles.

It is a further object of the present invention to provide an infrastructure system for supporting the driving of at least partially automated connected motor vehicles that is highly reliable.

According to an example embodiment of the present invention, a method for carrying out a plausibility check of a transmitted traffic light signal at an intersection system is provided, which at least comprises the steps:

- receiving a transmitted traffic light signal, wherein the traffic light signal represents a current traffic light phase of a traffic light of the intersection system and an associated lane;
- acquiring a traffic flow that crosses the traffic flow regulated by the traffic light signal and ascertaining characterizing data of the crossing traffic flow;
- evaluating the characterizing data to determine whether they correspond to the characterizing data to be expected in relation to the transmitted traffic light signal, and issuing a warning if a non-correspondence is detected.

According to an example embodiment of the present invention, the traffic light signal is in particular transmitted in addition to the actual light signal of the traffic light. The traffic light signal can be transmitted via a wireless data connection, for instance, for example using V2X communication. The traffic light signal can be transmitted to an infrastructure system, to a cloud, and/or to a connected traffic participant. The traffic light signal preferably comprises data that represents a current traffic light phase of a traffic light of the intersection system and the associated lane. The traffic light signal can also comprise further information, e.g., a timestamp and/or a duration until the traffic light phase changes and/or other information.

According to an example embodiment of the present invention, the characterizing data of the crossing traffic flow preferably comprises position data and/or speed data and/or acceleration data of objects moving along an intersecting lane. The objects can be motor vehicles or pedestrians or other traffic participants, for instance, the movement of which is regulated, for example by a second traffic light system or a second traffic light of the traffic light system.

According to an example embodiment of the present invention, the characterizing data of the crossing traffic flow is preferably determined by means of a stationary sensor system of an infrastructure system. For this purpose, the sensor system can, for example, comprise stationary surroundings sensors disposed in the area of the intersection system, which are configured as video cameras and/or as LiDAR sensors and/or as radar sensors, for instance. Alternatively or additionally, the sensor system can also include pressure sensors, for example in the road surface, and/or light barriers. It can also include sensors of other traffic participants that are transmitted to the infrastructure system via V2X communication. The measurement data acquired by the surroundings sensors and/or other sensors can be evaluated within the respective sensor and/or by a central computing unit (e.g. an RSU or a cloud) and used to ascertain characterizing data of the crossing traffic flow. The use of such a stationary sensor system can advantageously ensure a particularly up-to-date and accurate ascertainment of the characterizing data of the crossing traffic flow.

The ascertainment of the characterizing data of the crossing traffic flow particularly preferably includes the creation of at least one object list of objects that represent the crossing traffic flow within a specific spatial area around the intersection system, wherein the plausibility check is carried out on the basis of the object lists.

In a preferred embodiment of the present invention, the evaluation of the characterizing data includes acquiring a collective movement of a plurality of crossing objects, in particular of crossing motor vehicles. The expected characterizing data preferably comprise a speed and/or speed distribution and/or acceleration and/or acceleration direction of the crossing objects associated with a specific traffic light phase. The acquired collective movement of the crossing objects can therefore be used to determine a speed and/or speed distribution and/or acceleration and/or acceleration direction of the crossing objects and compare it with the expected characterizing data to determine whether the acquired collective movement corresponds to the current traffic light phase.

An increase in speed and/or a decrease in speed, for example, along a row of crossing objects is detected and assigned to a change of the traffic light phase.

This in particular makes it possible to detect a "red/yellow" phase for the crossing traffic flow, i.e. a change from "red" to "red/yellow" to "green" of the traffic light regulating the crossing traffic.

The transition from "red" to "green" typically takes one to two seconds. The red and yellow signal lamps of the traffic light regulating the crossing traffic light up at the same time.

A yellow phase for the crossing traffic flow, i.e., a change from "green" to "yellow" to "red" of the traffic light regulating the crossing traffic can be detected as well. The transition from "green" to "red" for a maximum permitted speed of 50 km/h usually takes three seconds. The yellow signal lamp lights up.

According to an example embodiment of the present invention, if the speed of the crossing traffic in the direction of the traffic light in an area, e.g., 50 m to 100 m before the intersection is steadily decreasing, it can be assumed that the traffic light phase for the crossing traffic is changing to "yellow" (and then subsequently to "red"). If the speed of the crossing traffic decreases to 0 km/h at the traffic light, the traffic light has changed to "red". The traffic light for the direction of travel under consideration is therefore "green" and should also transmit this. An erroneous "red" can be detected, but it is nonetheless not permissible to run a red traffic light that is transmitting a supposedly erroneous "red" state.

There is usually congestion in front of traffic lights when the phase is red. When the traffic light then changes to "green", the entire line of cars starts driving in the same direction, i.e., the speed of the crossing traffic in the direction of the traffic light steadily increases. This collective movement provides information about the traffic light phase without having to see the traffic light. In this case, the crossing traffic light has changed to "green" and the traffic light under consideration then has to be transmitting "red". Acquiring the collective movement therefore makes it possible to check whether the signal transmitted by the traffic light matches the current traffic flow.

If an almost constant speed greater than zero, in particular within a defined speed interval, of the crossing objects is recognized, this can be assigned to a red phase of the traffic light. This can also be referred to as "crossing "green" because the crossing traffic flow is traveling at a constant, normal traffic speed and it can therefore be assumed that a traffic light regulating the crossing traffic is in a green phase.

If an almost constant speed near or equal to zero of the crossing objects is recognized, this can be assigned to a green phase of the traffic light.

The present invention is in particular based on using the traffic crossing the traffic light to carry out a plausibility check of the traffic light signal sent by radio transmission to the at least partially automated connected motor vehicles, and issuing a warning to the at least partially automated connected motor vehicles if the transmitted traffic light signal seems implausible with respect to the crossing traffic. For example, it is implausible if the transmitted traffic light signal indicates that the traffic light is "green", but the observed crossing traffic has a speed significantly greater than zero, for example 50 km/h. On the other hand, it is plausible if the observed crossing traffic is at a constant 0 km/h when "green" is being transmitted.

The warning preferably includes a V2X message that is transmitted to at least one at least partially automated connected motor vehicle traveling in the area of the traffic light, wherein the V2X message in particular comprises an instruction to transfer the motor vehicle into a safe state if the plausibility check of a transmitted traffic light signal was negative, i.e. a contradiction between the transmitted traffic light signal and the crossing traffic flow is detected.

According to a second aspect of the present invention, a device is provided, which is configured to carry out all of the steps of the method according to the first aspect. According to an example embodiment of the present invention, for this purpose, the device in particular comprises:

- a communication unit configured to transmit and/or receive a traffic light signal, wherein the traffic light signal represents a current traffic light phase of a traffic light of the intersection system;
- an acquisition system configured to acquire a traffic flow which crosses the traffic flow regulated by the traffic light signal and ascertain characterizing data of the crossing traffic flow;
- an evaluation unit configured to evaluate the characterizing data to determine whether they correspond to the characterizing data to be expected in relation to the transmitted traffic light signal,
- and an output unit configured to issue a warning if a non-correspondence is detected.

According to a third aspect of the present invention, an infrastructure system for supporting the driving of at least partially automated connected motor vehicles is proposed, which is configured to carry out all of the steps of the method according to the first aspect and/or comprises a device according to the second aspect.

According to a fourth aspect of the present invention, a computer program is provided, which comprises instructions that, when the computer program is executed by a computer, prompt said computer to carry out a method according to the first aspect.

According to a fifth aspect of the present invention, a machine-readable storage medium is provided, on which the computer program according to the fourth aspect is stored.

The present invention advantageously satisfies the high safety requirements placed on a traffic light system in an environment of mixed traffic of manually controlled and at least partially automated motor vehicles while at the same time keeping costs low. Erroneous traffic light signals can be identified from outside the traffic light system and tagged as erroneous. This makes crossing a traffic light in mixed traffic safer for an at least partially automated motor vehicle.

The term "connected motor vehicle" includes a motor vehicle that comprises a suitable communication device with which the connected motor vehicle can exchange data with other traffic participants, in particular with an infrastructure system. For this purpose, a wireless data connection via which the connected motor vehicle can transmit and/or receive data is established. This can preferably be a radio link, for example a mobile radio link or a direct wireless connection. This type of communication between a motor vehicle and another traffic participant is also referred to as V2X or C2X communication.

The term "at least partially automated" includes one or more of the following cases: assisted driving, partially automated driving, highly automated driving and fully automated driving of a motor vehicle.

Assisted driving means that a driver of the motor vehicle continuously carries out either the lateral or the longitudinal guidance of the motor vehicle. The respective other driving task (i.e. controlling the longitudinal or lateral guidance of the motor vehicle) is carried out automatically. This means that either the lateral or the longitudinal guidance is controlled automatically when the motor vehicle is driven in an assisted manner.

Partially automated driving means that in a specific situation (for example: driving on a freeway, driving in a parking lot, passing an object, driving within a travel lane defined by lane markings) and/or for a certain period of time, a longitudinal and a lateral guidance of the motor vehicle are controlled automatically. A driver of the motor vehicle does not have to manually control the longitudinal and lateral guidance of the motor vehicle himself/herself. However, the driver has to continually monitor the automatic control of the longitudinal and lateral guidance in order to be able to intervene manually when necessary. The driver has to be ready to take over complete control of the motor vehicle at all times.

Highly automated driving means that for a certain period of time in a specific situation (for example: driving on a freeway, driving in a parking lot, passing an object, driving within a travel lane defined by lane markings) a longitudinal and a lateral guidance of the motor vehicle are controlled automatically. A driver of the motor vehicle does not have to manually control the longitudinal and lateral guidance of the motor vehicle himself/herself. The driver does not have to continuously monitor the automatic control of the longitudinal and lateral guidance in order to be able to intervene manually when necessary. If necessary, a take-over request is automatically issued to the driver to take over control of the longitudinal and lateral guidance, in particular issued with adequate time to respond. The driver therefore has to potentially be able to take control of the longitudinal and lateral guidance. Limits of the automatic control of the lateral and longitudinal guidance are recognized automatically. In highly automated driving, it is not possible to automatically bring about a minimal risk state in every initial situation.

Fully automated driving means that, in a specific situation (for example: driving on a freeway, driving in a parking lot, passing an object, driving within a travel lane defined by lane markings), longitudinal guidance and lateral guidance of the motor vehicle are controlled automatically. A driver of the motor vehicle does not have to manually control the longitudinal and lateral guidance of the motor vehicle himself/herself. The driver does not have to monitor the automatic control of the longitudinal and lateral guidance in order to be able to intervene manually when necessary. Before the automatic control of the lateral and longitudinal guidance is ended, the driver is automatically prompted to take over the driving task (control of the lateral and longitudinal guidance of the motor vehicle), in particular with adequate time to respond. If the driver does not take over the driving task, the system automatically returns to a minimal risk state. Limits of the automatic control of the lateral and longitudinal guidance are recognized automatically. In all situations, it is possible to automatically return to a minimal risk system state.

Driverless control or driving means that, regardless of a specific situation (for example: driving on a freeway, driving in a parking lot, passing an object, driving within a travel lane defined by lane markings), longitudinal guidance and lateral guidance of the motor vehicle are controlled automatically. A driver of the motor vehicle does not have to manually control the longitudinal and lateral guidance of the motor vehicle himself/herself. The driver does not have to monitor the automatic control of the longitudinal and lateral guidance in order to be able to intervene manually when necessary. The longitudinal and lateral guidance of the vehicle is therefore controlled automatically, for example for all road types, speed ranges and environmental conditions. Thus, the entire driving task of the driver is automatically taken over. There is consequently no longer a need for the driver. The motor vehicle can therefore drive from any starting position to any destination position even without a driver. Potential problems are solved automatically, i.e. without the help of the driver.

Remote control of the motor vehicle means that a lateral and longitudinal guidance of the motor vehicle is controlled remotely. This means, for instance, that remote control signals for remotely controlling the lateral and longitudinal guidance are transmitted to the motor vehicle. The remote control is carried out by a remote control device, for example.

BRIEF DESCRIPTION OF THE DRAWINGS

Embodiments of the present invention will be described in detail with reference to the accompanying figures.

DETAILED DESCRIPTION OF EXAMPLE EMBODIMENTS

In the following description of the embodiment examples of the present invention, the same elements are labeled with the same reference signs and a repeated description of these elements is omitted where appropriate. The figures show the subject matter of the present invention only schematically.

Figure 1:
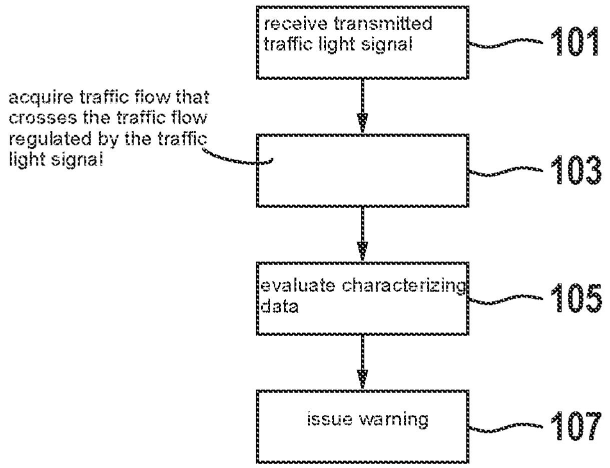
FIG. 1 shows a flowchart of a method according to a first embodiment example of the present invention.

FIG. 1 shows a flow of a method for carrying out a plausibility check of a transmitted traffic light signal at an intersection system according to a possible embodiment of the present invention. In a first step 101, a transmitted traffic light signal is received, wherein the traffic light signal represents a current traffic light phase of a traffic light of the intersection system and an associated lane. The traffic light signal can be transmitted by radio, for example, and comprises information as to whether the current traffic light phase is "red", "red" "yellow", "yellow" or "green". The traffic light signal is preferably transmitted at regular time intervals. In a following second step 103, a traffic flow that crosses the traffic flow regulated by the traffic light signal is acquired and characterizing data of the crossing traffic flow are ascertained. For this purpose, measurement data from a stationary surroundings sensor in the area of the intersection system, for example, are acquired and evaluated. In a following step 105, the characterizing data are evaluated to determine whether they correspond to the characterizing data to be expected in relation to the transmitted traffic light signal. The expected characterizing data relates to a speed and/or a speed distribution of objects in the crossing traffic flow, for instance. In step 107, a warning is issued if a non-correspondence is determined in step 105.

Figure 2:
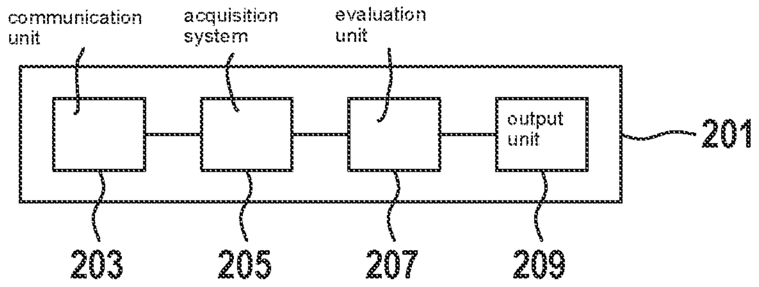
FIG. 2 shows a device according to a second embodiment example of the present invention.

FIG. 2 shows a device 201 which is configured to carry out all of the steps of a method according to the present invention for carrying out a plausibility check of a transmitted traffic light signal at an intersection system. The device 201 comprises a communication unit 203 which is configured to transmit and/or receive a traffic light signal, wherein the traffic light signal represents a current traffic light phase and an associated lane of a traffic light of the intersection system. The device 201 further comprises an acquisition system 205 which is configured to acquire a traffic flow that crosses the traffic flow regulated by the traffic light signal and ascertain characterizing data of the crossing traffic flow. For this purpose, the acquisition system 205 can receive measurement data from surroundings sensors, for example. The device further comprises an evaluation unit 207, which is configured to evaluate the characterizing data to determine whether they correspond to the characterizing data to be expected in relation to the traffic light signal. The expected characterizing data can, for example, be provided as reference data in the evaluation unit depending on the current traffic light phase.

The device 201 also comprises an output unit 209, which is configured to issue a warning if a non-correspondence is detected.

Figure 3:
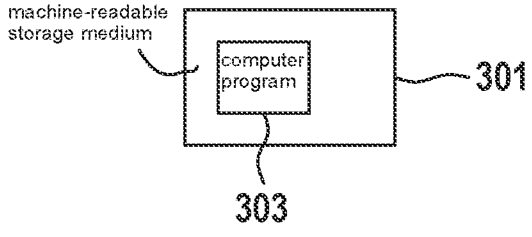
FIG. 3 shows a storage medium with a computer program according to a third embodiment example of the present invention.

FIG. 3 shows a machine-readable storage medium 301 on which a computer program 303 is stored. The computer program includes instructions that, when the computer program 303 is executed by a computer, prompt said computer to carry out a method for carrying out a plausibility check of a transmitted traffic light signal at an intersection system according to a possible embodiment of the present invention.

Figure 4:
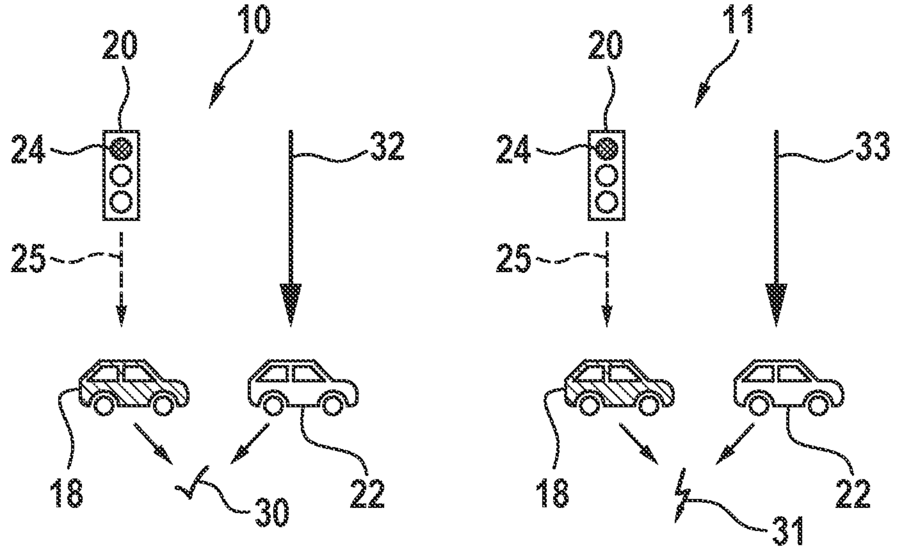
FIG. 4 schematically shows a situation at a traffic light system and the reception of a traffic light signal by an automated motor vehicle according to the related art.

FIG. 4 illustrates the problem on which the present invention is based. The drawing on the left schematically shows a traffic situation 10, in which a manually controlled motor vehicle 18 and an automated motor vehicle 22 are driving through an intersection system and the traffic flow at this intersection system is regulated by a traffic light system. The traffic light system includes a traffic light 20. In the shown example, the current traffic light phase 24 is “red”. Therefore all of the vehicles in the lane regulated by the traffic light 20 have to stop. The human driver of the manually controlled motor vehicle 18 perceives the current traffic light phase 24 as a light signal 25 and reacts accordingly. The automated motor vehicle 22, on the other hand, receives a traffic light signal 32 transmitted by the traffic light system, for example, which represents the current traffic light phase 24 of the traffic light 20 of the intersection system. In error-free operation, the traffic light signal 32 comprises the information that the current traffic light phase 24 is “red” and the automated motor vehicle 22 can be controlled accordingly and can, for example, brake or stop. The traffic light signal 32 and the traffic light phase 24 are consistent and there is no danger (indicated in the figure by the checkmark 30).

The traffic situation 11 on the right side of FIG. 4 shows the case that the traffic light signal 33, which is transmitted by the traffic light system and represents the current traffic light phase 24 of the traffic light 20 of the intersection system, is incorrect and incorrectly assumes “green” as the current traffic light phase. The human driver of the manually controlled motor vehicle 18 perceives the current traffic light phase 24 as a light signal 25 and reacts accordingly. The automated motor vehicle 22, on the other hand, receives the erroneous traffic light signal 33 and reacts incorrectly. Hazards can arise (indicated in the figure by the lightning bolt 31).

Figure 5:
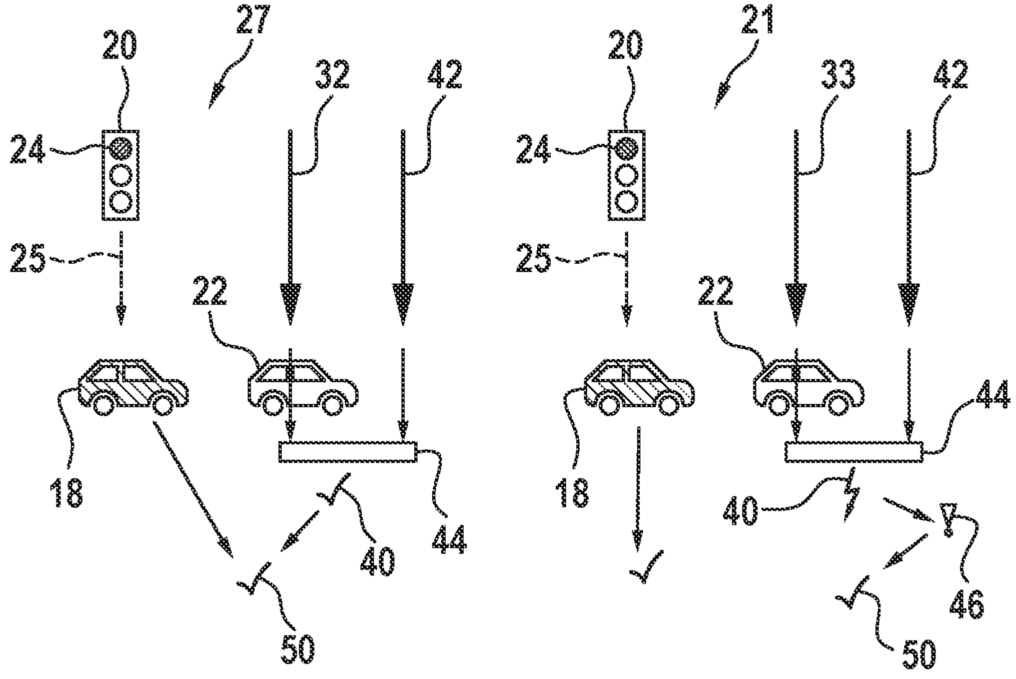
FIG. 5 schematically shows a situation at a traffic light system and the reception of a traffic light signal by an automated motor vehicle with a plausibility check according to an embodiment of the present invention.

FIG. 5 illustrates how the previously identified problem can be solved in the context of the present invention. The drawing on the left schematically shows a traffic situation 20, in which a manually controlled motor vehicle 18 and an automated motor vehicle 22 are driving through an intersection system and the traffic flow at this intersection system is regulated by a traffic light system. The traffic light system includes a traffic light 20. In the shown example, the current traffic light phase 24 is “red”. Therefore all of the vehicles in the lane regulated by the traffic light 20 have to stop. The human driver of the manually controlled motor vehicle 18 perceives the current traffic light phase 24 as a light signal 25 and reacts accordingly. The automated motor vehicle 22, on the other hand, receives a traffic light signal 32 transmitted by the traffic light system, for example, which represents the current traffic light phase 24 of the traffic light 20 of the intersection system. In error-free operation, the traffic light signal 32 comprises the information that the current traffic light phase 24 is “red” and the automated motor vehicle 22 can be controlled accordingly and can, for example, brake or stop. To verify or check the plausibility of this, the traffic light signal 32 is received by a device 44. The device 44 can be included in an infrastructure system that monitors and/or controls the intersection system, for instance. The device 44 can be configured as an RSU, ICU, or in a cloud, for example. The device 44 is also configured to acquire a traffic flow that crosses the traffic flow regulated by the traffic light signal 32 and ascertain characterizing data 42 of the crossing traffic flow. For this purpose, the device 44 can receive and evaluate measurement data from stationary and/or non-stationary surroundings sensors in the area of the intersection system. for example. The device 44 can evaluate the characterizing data to determine whether they correspond to the characterizing data to be expected in relation to the transmitted traffic light signal 32. This is the case in the example 27 and the result 40 of the plausibility check is positive. No danger is to be expected (indicated in the figure by the checkmark 50).

The traffic situation 21 on the right side of FIG. 5 shows the case that the traffic light signal 33, which is transmitted by the traffic light system and represents the current traffic light phase 24 of the traffic light 20 of the intersection system, is incorrect and incorrectly assumes “green” as the current traffic light phase. The human driver of the manually controlled motor vehicle 18 perceives the current traffic light phase 24 as a light signal 25 and reacts accordingly. The automated motor vehicle 22, on the other hand, receives the erroneous traffic light signal 33. The erroneous traffic light signal 33 is also received by the device 44. The plausibility check now provides the result 40 that no correspondence between the characterizing data associated with or expected from the traffic light signal 33 and the characterizing data 42 of the crossing traffic flow is found. It must therefore be assumed that there is an error. The device 44 issues a warning 46 to the automated motor vehicle 22 and/or the manually controlled motor vehicle 18 so that danger can be avoided (indicated in the figure by the checkmark 50).

FIG. 6 schematically shows how the acquisition of a traffic flow that crosses the traffic flow regulated by the traffic light signal and the ascertainment of characterizing data of the crossing traffic flow can be used to infer the traffic light phase of a traffic light regulating the crossing traffic and thus also the traffic light phase of a traffic light under consideration.

Figure 6A:
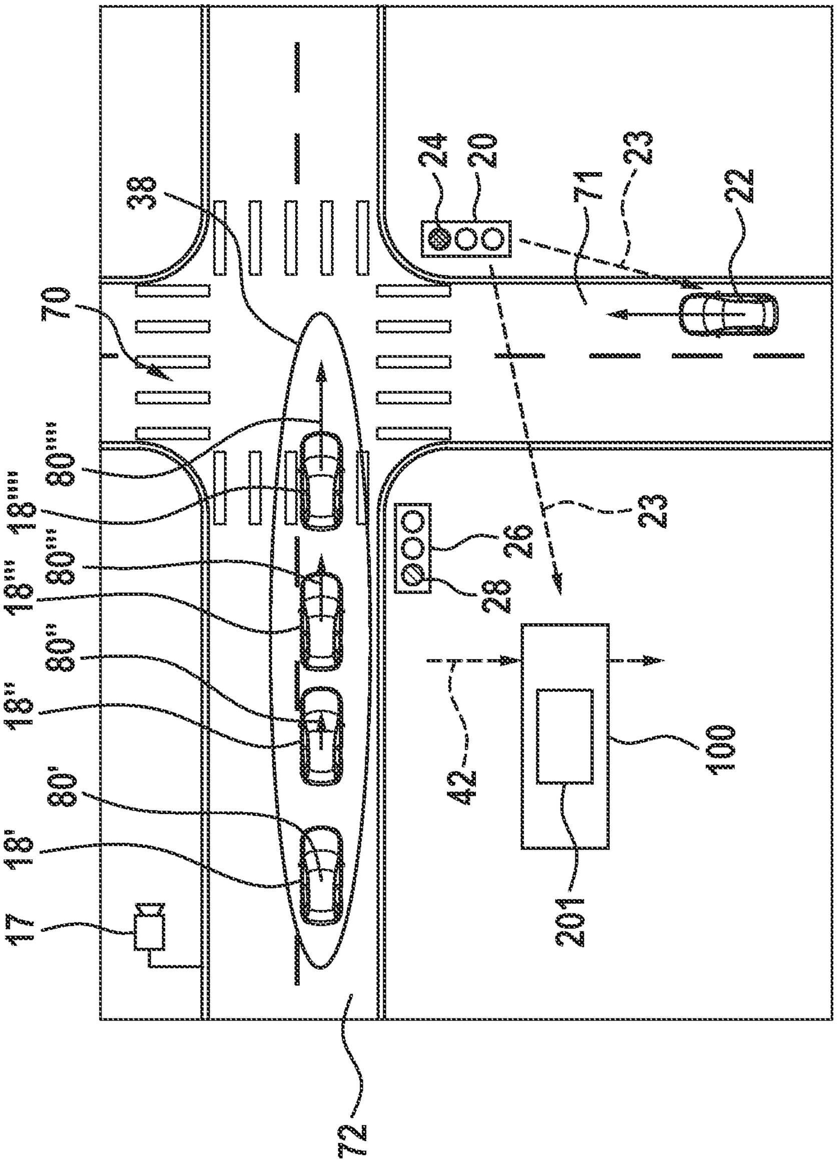
FIG. 6A shows a first traffic situation.

FIG. 6A shows an intersection system 70. A highly automated motor vehicle 22 is approaching the intersection in a lane 71. The traffic flow of lane 71 is regulated by a traffic light 20. The traffic light 20 is currently showing the traffic light phase 24 "red". The traffic light 20 transmits a traffic light signal 23, which represents the current traffic light phase 24 of the traffic light 20, to the motor vehicle 22 and to an infrastructure system 100 (for example a RSU) comprising a device 201 which is configured to carry out a method for carrying out a plausibility check of the transmitted traffic light signal. For this purpose, the traffic flow 38 in the lane 72, which crosses the traffic flow regulated by the traffic light 20 or the traffic light signal 23, is acquired by means of an acquisition system, wherein the acquisition system in this example comprises a surroundings sensor 17 which is configured as a stationary camera. It is alternatively also possible for there to be multiple surroundings sensors. Characterizing data of the crossing traffic flow 38 are ascertained. For this purpose, objects 18'-18'''' in the lane 72 in the area of the intersection (e.g. 50 meters to 100 meters before the intersection) are acquired, for example, and their positions, speeds 80'-80'''' and/or accelerations are measured and consolidated into an object list. The object list can then be evaluated by the device 201 as data 42 characterizing the crossing traffic flow to determine whether they correspond to the characterizing data to be expected in relation to the transmitted traffic light signal 23. A collective movement of the objects 18'-18'''' can be analyzed for this purpose, for example, and a speed distribution along the row of the objects 18'-18'''' can be determined. In the shown example, the rearmost object 18' has the speed zero. The speeds 80'-80'''' of the objects 18'-18'''' increase along the row (in the direction of the intersection). The line of vehicles is therefore just starting to drive. This can be taken as an indication that a traffic light 26 that regulates the crossing traffic flow in the lane 72 has recently starting showing the traffic light phase 28 "green" or the traffic light phase 26 "red/yellow" (imminent "green" of the traffic light 26). In either case, this means that traffic light phase 24 of the traffic light 20 under consideration must be "red". This result of the evaluation of the data 42 characterizing the crossing traffic flow can then be compared with the information from the traffic light signal 23. If a deviation is detected, the infrastructure system 100 and/or the device 201 can issue a warning at least to the highly automated motor vehicle 22.

Figure 6B:
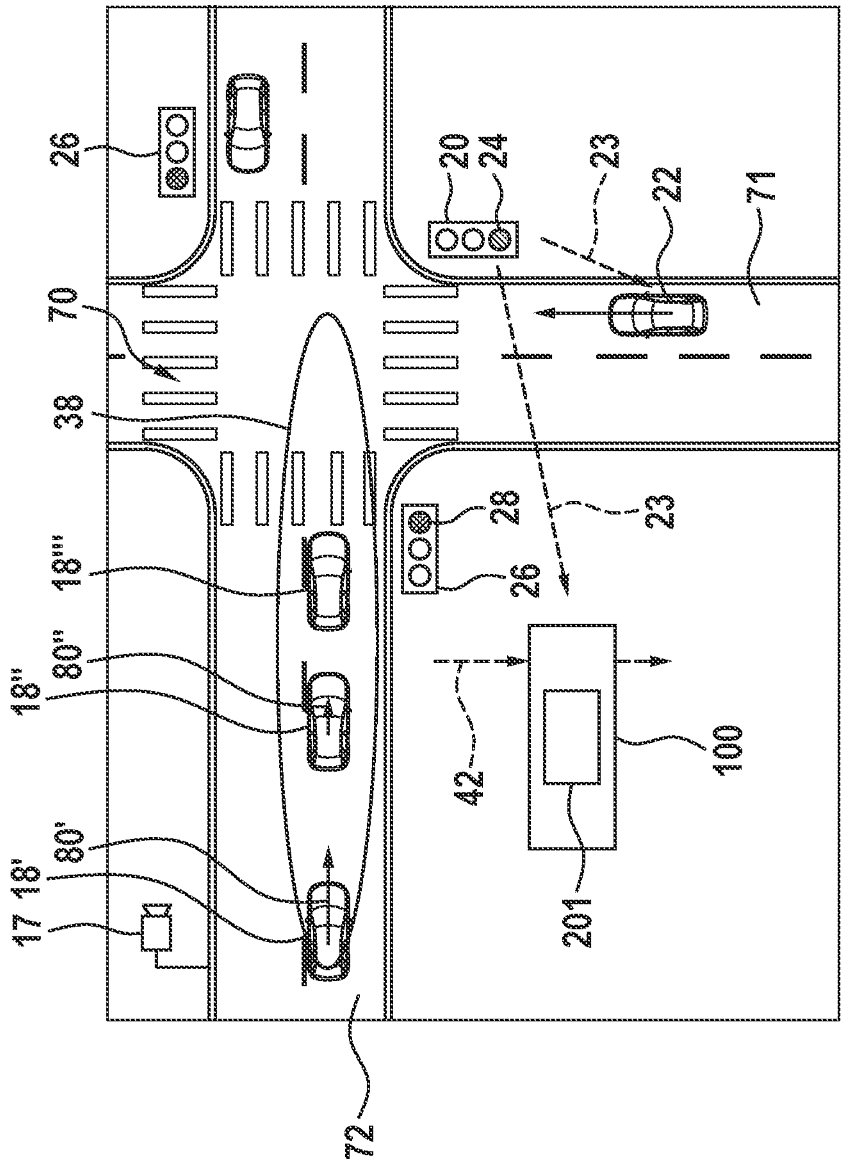
FIG. 6B shows a second traffic situation.

FIG. 6B shows the same intersection system 70 in a different situation. Again, characterizing data of the crossing traffic flow 38 are ascertained. For this purpose, objects 18'-18''' in the lane 72 in the area of the intersection (e.g. 50 meters to 100 meters before the intersection) are acquired, for example, and their positions, speeds 80'-80''' and/or accelerations are measured and consolidated into an object list. A collective movement of the objects 18'-18''' can be analyzed and a speed distribution along the row of the objects 18'-18''' can be determined. In the shown example, the objects 18'-18''' are manually controlled motor vehicles. In the shown example, the rearmost object 18' has the highest speed, the object 18''' directly in front of the traffic light 26 has the speed 80''' zero. The speeds 80'-80''' of the objects 18'-18''' decrease along the row (in the direction of the intersection). The line of vehicles is therefore just coming to a standstill. This can be taken as an indication that a traffic light 26 that regulates the crossing traffic flow in the lane 72 has recently starting showing the traffic light phase 28 "red" or the traffic light phase 26 "yellow" (imminent "red" of the traffic light 26). In either case, this means that traffic light phase 24 of the traffic light 20 under consideration can or may be "green". This result of the evaluation of the data 42 characterizing the crossing traffic flow can then be compared with the information from the traffic light signal 23. If a deviation is detected, the infrastructure system 100 and/or the device 201 can issue a warning at least to the highly automated motor vehicle 22.

What is claimed is:

1. A method for carrying out a plausibility check of a transmitted traffic light signal at an intersection system, comprising the following steps:

receiving a transmitted traffic light signal, wherein the traffic light signal represents a current traffic light phase and an associated lane of a traffic light of the intersection system;

acquiring a traffic flow that crosses a traffic flow regulated by the traffic light signal, and ascertaining characterizing data of the crossing traffic flow;

evaluating the characterizing data to determine whether they correspond to the characterizing data to be expected in relation to the transmitted traffic light signal; and issuing a warning based on detecting a non-correspondence, wherein a stationary sensor system disposed in the area of the intersection system is configured to acquire the crossing traffic flow, the stationary sensor system including at least one of a video camera, a LiDAR sensor, or a radar sensor.

2. The method according to claim 1, wherein the characterizing data of the crossing traffic flow include position data of objects and/or speed data of objects and/or acceleration data of objects.

3. The method according to claim 1, wherein the characterizing data of the crossing traffic flow is determined using a stationary sensor system of an infrastructure system.

4. The method according to claim 3, wherein at least one object list of objects that represent the crossing traffic flow within a specific spatial area around the intersection system is created, wherein the plausibility check is carried out based on the at least one object list.

5. The method according to claim 1, wherein the evaluation of the characterizing data includes acquiring a collective movement of a plurality of crossing objects, wherein the expected characterizing data include a speed of the crossing objects and/or a speed distribution of the crossing objects and/or an acceleration of the crossing objects and/or acceleration direction of the crossing objects, associated with a specific traffic light phase.

6. The method according to claim 5, wherein the crossing objects are crossing motor vehicles.

7. The method according to claim 5, wherein an increase in speed and/or a decrease in speed along a row of crossing objects is recognized and assigned to: (i) a specific traffic light phase and/or (ii) a change of a traffic light phase.

8. The method according to claim 5, wherein an almost constant speed greater than zero, within a defined speed interval, of the crossing objects is recognized and assigned to a red phase of the traffic light.

9. The method according to claim 5, wherein an almost constant speed near or equal to zero of the crossing objects is recognized and assigned to a green phase of the traffic light.

10. The method according to claim 1, wherein the warning includes a V2X message transmitted to at least one at least partially automated connected motor vehicle that is moving in an area of the traffic light, wherein the V2X message includes an instruction to transfer the motor vehicle into a safe state.

11. A device for carrying out a plausibility check of a transmitted traffic light signal at an intersection system, the device comprising:

a unit communicator configured to transmit and/or receive a traffic light signal, wherein the traffic light signal represents a current traffic light phase of a traffic light of the intersection system;

an acquirer configured to acquire a traffic flow which crosses a traffic flow regulated by the traffic light signal and ascertain characterizing data of the crossing traffic flow;

an evaluator configured to evaluate the characterizing data to determine whether they correspond to the characterizing data to be expected in relation to the transmitted traffic light signal; and an outputter configured to issue a warning if a non-correspondence is detected;

wherein a stationary sensor system disposed in the area of the intersection system is configured to acquire the crossing traffic flow, the stationary sensor system including at least one of a video camera, a LiDAR sensor, or a radar sensor.

12. An infrastructure system for supporting driving of an at least partially automated connected motor vehicle, the infrastructure system being configured to carry out a plausibility check of a transmitted traffic light signal at an intersection system, the infrastructure system configured to:

receive a transmitted traffic light signal, wherein the traffic light signal represents a current traffic light phase and an associated lane of a traffic light of the intersection system;

acquire a traffic flow that crosses a traffic flow regulated by the traffic light signal, and ascertaining characterizing data of the crossing traffic flow;

evaluate the characterizing data to determine whether they correspond to the characterizing data to be expected in relation to the transmitted traffic light signal; and issue a warning based on detecting a non-correspondence;

wherein a stationary sensor system disposed in the area of the intersection system is configured to acquire the crossing traffic flow, the stationary sensor system including at least one of a video camera, a LiDAR sensor, or a radar sensor.

13. A non-transitory machine-readable storage medium on which is stored a computer program for carrying out a plausibility check of a transmitted traffic light signal at an intersection system, the computer program, when executed by a computer, causing the computer to perform the following steps:

receiving a transmitted traffic light signal, wherein the traffic light signal represents a current traffic light phase and an associated lane of a traffic light of the intersection system;

acquiring a traffic flow that crosses a traffic flow regulated by the traffic light signal, and ascertaining characterizing data of the crossing traffic flow;

evaluating the characterizing data to determine whether they correspond to the characterizing data to be expected in relation to the transmitted traffic light signal; and issuing a warning based on detecting a non-correspondence;

wherein a stationary sensor system disposed in the area of the intersection system is configured to acquire the crossing traffic flow, the stationary sensor system including at least one of a video camera, a LiDAR sensor, or a radar sensor.

* * * * *